United States Patent
Wang et al.

(10) Patent No.: US 10,136,166 B1
(45) Date of Patent: Nov. 20, 2018

(54) METHOD AND SYSTEM FOR COMMUNICATING INSERTED MATERIAL TO A CLIENT DEVICE IN A CENTRALIZED CONTENT DISTRIBUTION SYSTEM

(71) Applicant: The DIRECTV Group, Inc., El Segundo, CA (US)

(72) Inventors: Phillip T. Wang, Rockville, MD (US); Sean S. Lee, Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 303 days.

(21) Appl. No.: 14/563,460

(22) Filed: Dec. 8, 2014

(51) Int. Cl.
| | |
|---|---|
| *H04N 7/025* | (2006.01) |
| *H04N 7/10* | (2006.01) |
| *H04N 21/234* | (2011.01) |
| *H04N 21/436* | (2011.01) |
| *H04N 19/44* | (2014.01) |
| *H04N 19/593* | (2014.01) |
| *H04N 21/8547* | (2011.01) |
| *H04N 5/783* | (2006.01) |
| *H04N 21/2387* | (2011.01) |
| *H04N 21/43* | (2011.01) |
| *H04N 21/44* | (2011.01) |

(52) U.S. Cl.
CPC ....... *H04N 21/23424* (2013.01); *H04N 5/783* (2013.01); *H04N 7/106* (2013.01); *H04N 19/44* (2014.11); *H04N 19/593* (2014.11); *H04N 21/2387* (2013.01); *H04N 21/4307* (2013.01); *H04N 21/43615* (2013.01); *H04N 21/43622* (2013.01); *H04N 21/44016* (2013.01); *H04N 21/8547* (2013.01)

(58) Field of Classification Search
CPC .... H04N 21/43; H04N 21/4307; H04N 21/44; H04N 21/44016
USPC .............................................. 725/32, 34, 36
See application file for complete search history.

(56) References Cited

U.S. PATENT DOCUMENTS

| | | | | |
|---|---|---|---|---|
| 6,993,081 | B1 * | 1/2006 | Brunheroto | H04N 21/23406 370/487 |
| 7,096,481 | B1 * | 8/2006 | Forecast | H04N 21/23406 348/E5.008 |
| 2010/0172498 | A1 * | 7/2010 | Malcolm | G09C 5/00 380/237 |

(Continued)

*Primary Examiner* — James R Sheleheda
(74) *Attorney, Agent, or Firm* — Harness, Dickey & Pierce, P.L.C.

(57) ABSTRACT

A system and method includes a local area network, a client device, a replacement metadata determination module and a server device in communication with the client device through the local area network. The server device communicates main content to a client device. The main content comprises a plurality of main content packets. The server device determines main content metadata from the main content prior to communicating main content to the client device and determines insert content metadata from insert content. The insert content comprises a plurality of insert packets comprising the insert content metadata. The replacement metadata determination module determines a replacement metadata for the insert content based on the main content metadata. The server device replaces the insert metadata with the replacement metadata to form modified insert packets and communicates modified insert packets to the client device thereafter.

16 Claims, 14 Drawing Sheets

(56) References Cited

U.S. PATENT DOCUMENTS

| | | | | |
|---|---|---|---|---|
| 2010/0322091 | A1* | 12/2010 | Savoor | H04L 29/06027 370/252 |
| 2012/0316965 | A1* | 12/2012 | Mathews | G06Q 30/0269 705/14.61 |
| 2014/0344852 | A1* | 11/2014 | Reisner | H04N 21/2668 725/32 |
| 2015/0082368 | A1* | 3/2015 | Mamidwar | H04N 21/4405 725/118 |

* cited by examiner

METHOD AND SYSTEM FOR COMMUNICATING INSERTED MATERIAL TO A CLIENT DEVICE IN A CENTRALIZED CONTENT DISTRIBUTION SYSTEM

TECHNICAL FIELD

The present disclosure relates generally communicating between a server device and a client device, and, more specifically, to communicating inserted content to a client device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Many content providers are offering systems that provide a centralized server with a large video storage device therein. Multiple clients are connected to the server to allow video content to be displayed at a display device associated with the server. Typically, the client device is controlled using an infrared remote control device that sends a key command from the client to the server based upon buttons selected by the user. These commands are small bitwise and are acted upon immediately by the server.

In a client based television distribution system performing trickplay operations and advertisement insertion is becoming more desirable. However, to perform such functions it is undesirable to increase the complexity of a client device. Client devices are intended to be relatively simple devices. Many types of devices may act as client devices, including standalone set top boxes, video games and electronic components included within a television. Because of the variability of electronics manufacturers, performing various functions at the client devices may not provide a consistent playback experience for all consumers.

SUMMARY

The present disclosure provides a method and system for dynamically inserting content into another content stream such that to the client device the content stream is uninterrupted and continuous. This dynamic content insertion provides an improved customer experience.

In one aspect of the disclosure, a method includes communicating main content from the server device to a client device. The main content comprises a plurality of main content packets. The method further includes determining main content metadata from the main content prior to communicating main content to the client device, determining insert content metadata from insert content, said insert content comprising a plurality of insert packets comprising the insert content metadata, determining a replacement metadata for the insert content based on the main content metadata, replacing the insert metadata with the replacement metadata to form modified insert packets at the server device, and after replacing, communicating modified insert packets from the server device to the client device.

In a further aspect of the disclosure, a system includes a local area network, a client device, a replacement metadata determination module and a server device in communication with the client device through the local area network. The server device communicates main content to a client device. The main content comprises a plurality of main content packets. The server device determines main content metadata from the main content prior to communicating main content to the client device and determines insert content metadata from insert content. The insert content comprises a plurality of insert packets comprising the insert content metadata. The replacement metadata determination module determines a replacement metadata for the insert content based on the main content metadata. The server device replaces the insert metadata with the replacement metadata to form modified insert packets and communicates modified insert packets to the client device thereafter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
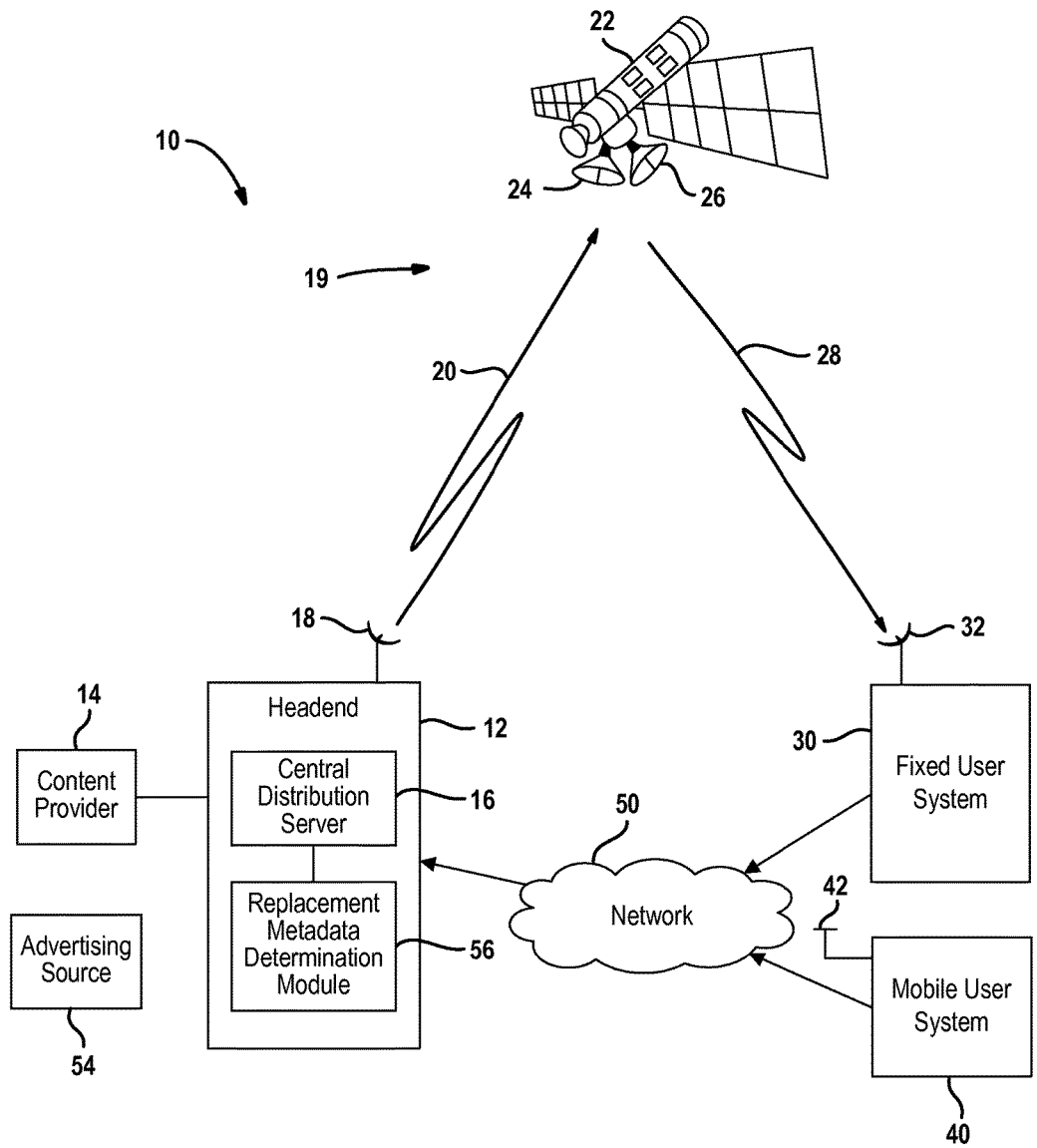
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a communication system 10 is illustrated. Communication system 10 includes a head end 12 that is used as a processing and transmission source. The head end 12 may be referred to as a head end. A plurality of content providers 14, only one of which illustrated, may provide content to the head end 12. The head end 12 receives various types of content from a content provider 14 and communicates the content to system users. The head end 12 may also be associated with a central distribution server 16. The central distribution server 16 may be incorporated into the head end 12 or may be a separate item. The central distribution server 16 may be used for various types of distribution including resetting a user device, providing a software image, communicating advertisements or replacement metadata, or providing an updated software image to a user device.

The head end 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the head end 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network or a combination thereof. The network 50 may be a one-way network so that data or content may be communicated from the fixed user system 30 or the mobile user system 40 through the network 50 to the head end 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the head end 12, which includes the distribution server 16, and the fixed user system 30 and the mobile user system 40.

The head end 12 may also be in communication with an advertising source 54. The advertising source 54 may provide advertising content to be used as insert content to the head end 12. The head end 12 communicates the advertisement insert content to the user systems through the satellite 22 or the network 50. Advertising source 54 may provide the advertisement with various types of metadata that are used in the content broadcasting.

The content provided by the head end 12 and the advertising source 54 may be provided in transport stream comprising a plurality of packets. Along with the audio and video streams, metadata may also be included with the packets forming the advertising insert content and the content processing system content.

The head end 12 may also include a replacement metadata determination module 56 that determines replacement metadata for insert content metadata. Replacement metadata is used to allow the client device to play the content seamlessly without have to reformat for a discontinuation of main content. The replacement metadata uses the field value or values of the metadata of the main content to calculate the replacement metadata. The replacement metadata may be communicated to various servers in the fixed user system 30 or the mobile user system 40. The replacement metadata determined by the replacement metadata determination module 56 may correspond to one or more values within the metadata. Replacement metadata for replacing the insert content metadata for each insert content packet may be generated and communicated. The replacement metadata process is described in detail below as a reflow process that allows the content playback to flow seamlessly at a client device from main content to insert content.

Figure 2:
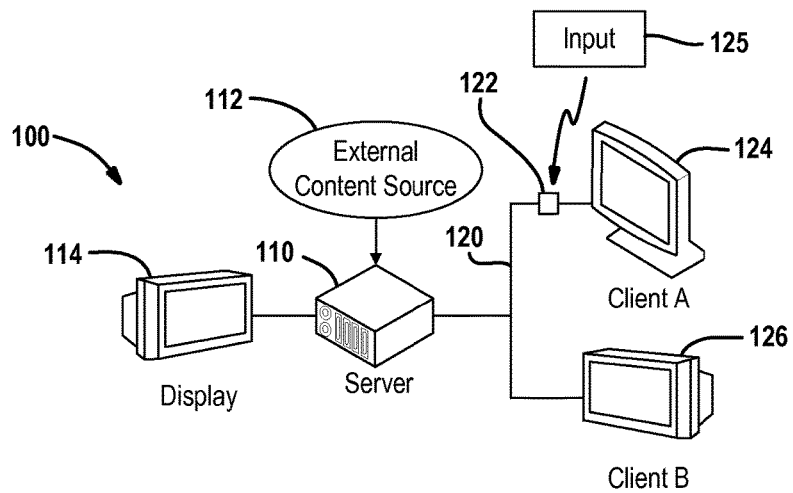
FIG. 2 is a block diagrammatic view of a first network topology.

Referring now to FIG. 2, one example of a user system 100 is illustrated in further detail. The user systems illustrated in FIGS. 2-5 may be mobile or fixed. The user system 100 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, advertisements and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

The client device 122 may receive signals from an input 125. The input 125 may be various types of devices such as a tablet computer, a cellular phone or the like. The input provides an input command indicative of the user wanting to control a function of the client device or server device. The input may also be a person generating an audio signal comprising a voice signal with spoken words. The input signals from the input 125 may be in a variety of forms including RF, optical signals, a voice signal or the like. Examples of an input type include an audio input signals, a graphical input signal, a gesture signal such as a performing a swipe command on a touch screen of an input device used for the input 125, a pointing device signal such as a mouse or stylus or another type of graphical input.

Ultimately, the input 125 provides a signal to the client device 122. The client device 122 converts the input 125 to data which is communicated to the server device 110. The server device 110 generates a response to the client. The response may be a changed video input or a changed remote user interface.

The input 125 could provide a relatively large amount of data compared to a standard infrared remote control. For the server device to receive the relatively large amount of data, memory in the server device optionally could be allocated, at least temporarily, for receiving the data so that the data may be processed therefrom. It is also possible that the server device has set aside a dedicated amount of memory for receiving the data such that specific memory allocation commands are not necessary.

A second client, Client B, may also be in communication with the server device 110 through the local area network 120. Client B may contain an internal client device, not shown, for displaying rendered signals on the display. The internal client device may be functionally equivalent to the standalone client device 122. Because both the first client, Client A, and the second client, Client B, are in communication directly with the server device 110, the network may be referred to as a closed network. Various numbers of clients may be connected to the local area network 120. The input 125 may also be in direct communication with the Client B 126. That is, the input 125 may be directly input to a display or television. The display or television of Client B 126 may process the signals like the client device 122.

Figure 3:
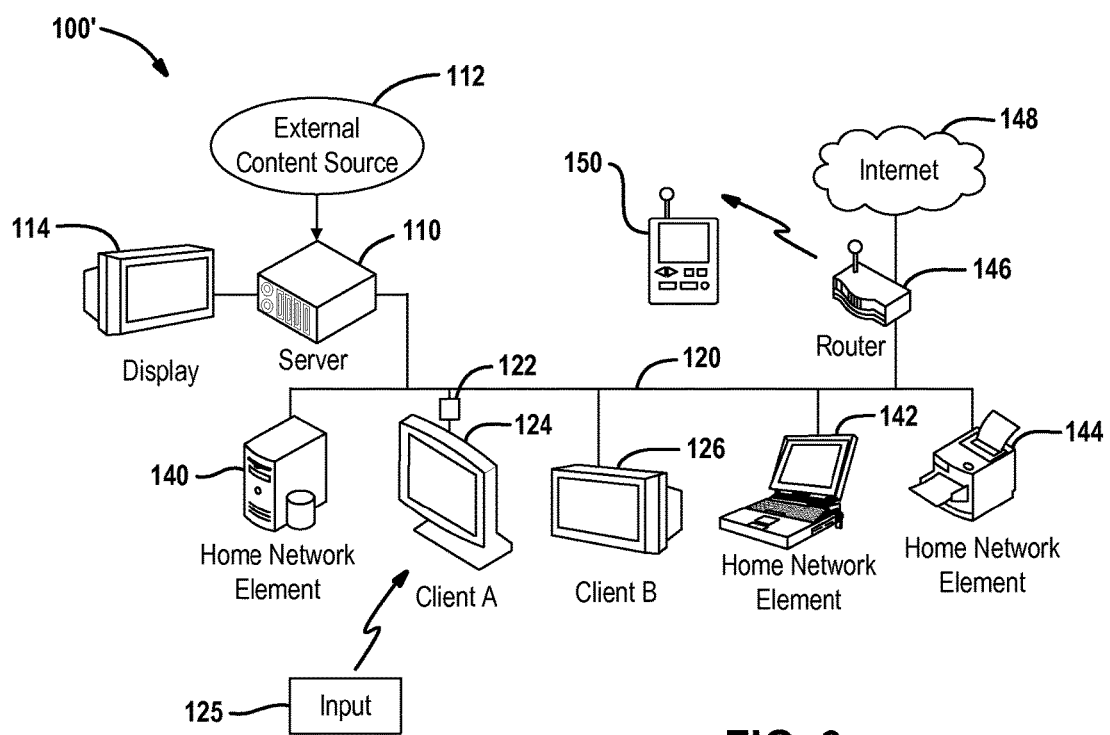
FIG. 3 is a block diagrammatic view of a second example of the network topology.

Referring now to FIG. 3, a user system 100' which is an open network is illustrated. In this example, the same components described above in FIG. 2 are provided with the same reference numerals. In this example, the local area network 120 may include a number of home network elements. One home network element may be a home network server device 140 or other computing device. Another home network element may include a laptop computer 142 that is in communication with the local area network 120. Another home network element may include a network printer 144 and a router 146. The router 146 may communicate with other devices through an external network such as the Internet 148.

The user system 100' may also have wireless elements associated therewith. The router 146 or another network device may generate wireless signals that allow a wireless device 150 to communicate with at least one server device 110 or 140. The wireless device 150 may, for example, be a personal digital assistant, a cellular phone, a personal media device or a Blu-Ray or DVD player. Of course, other wireless devices may be part of the network.

Figure 4:
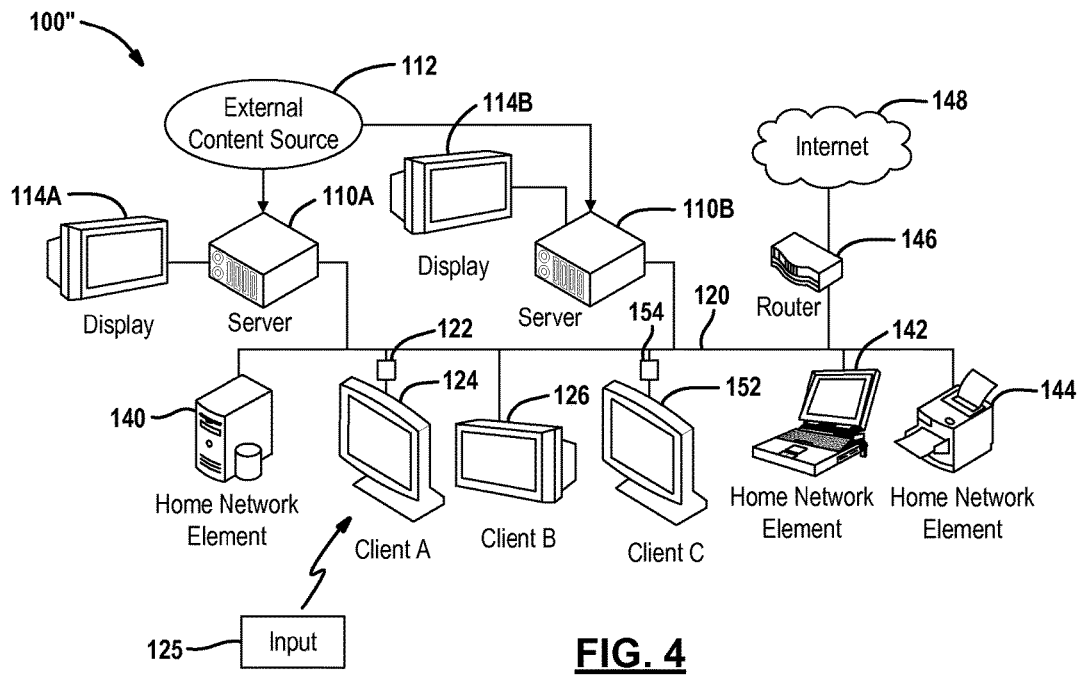
FIG. 4 is a block diagrammatic view of a third example of a network topology.

Referring now to FIG. 4, another example of a user system 100" is illustrated. In this example, the same elements from FIGS. 2 and 3 are provided with the same reference numerals. The local area network 120 may also include two server devices 110A and 110B. Each server device may include an optional display device 114A, 114B, respectively. In this example a third client, Client C, is illustrated having a display 152 and a client device 154.

Figure 5:
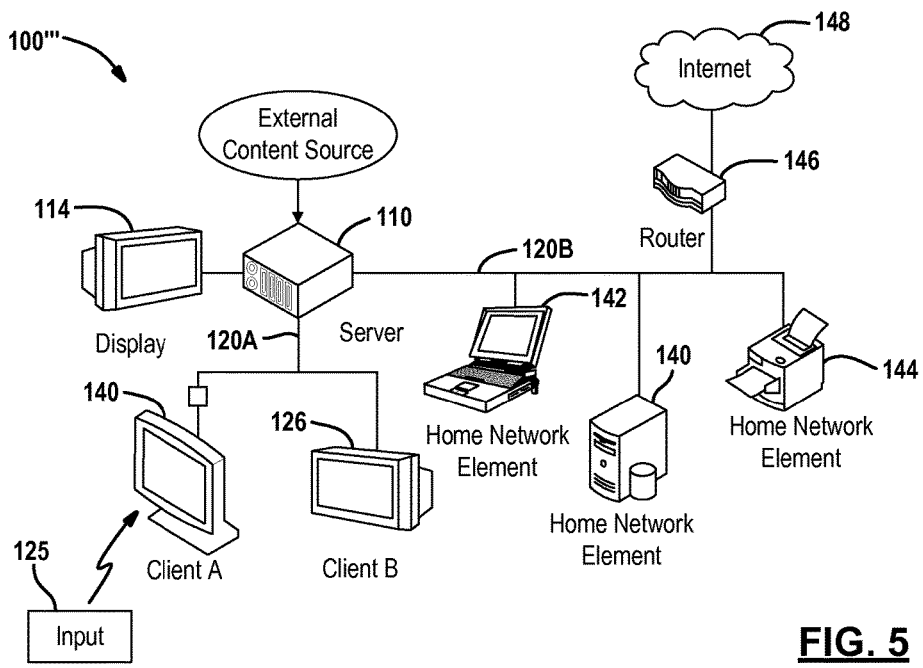
FIG. 5 is a block diagrammatic view of a fourth example of a network topology.

Referring now to FIG. 5, providing customers with reliable service is important. A fourth example of the user system 100''' is illustrated. In certain cases, a home network may not be as reliable as a direct connection. In FIG. 5, the local area network is divided into a first local area network 120A between the first client, Client A, the second client, Client B, and the server device 110. That is, the server device 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
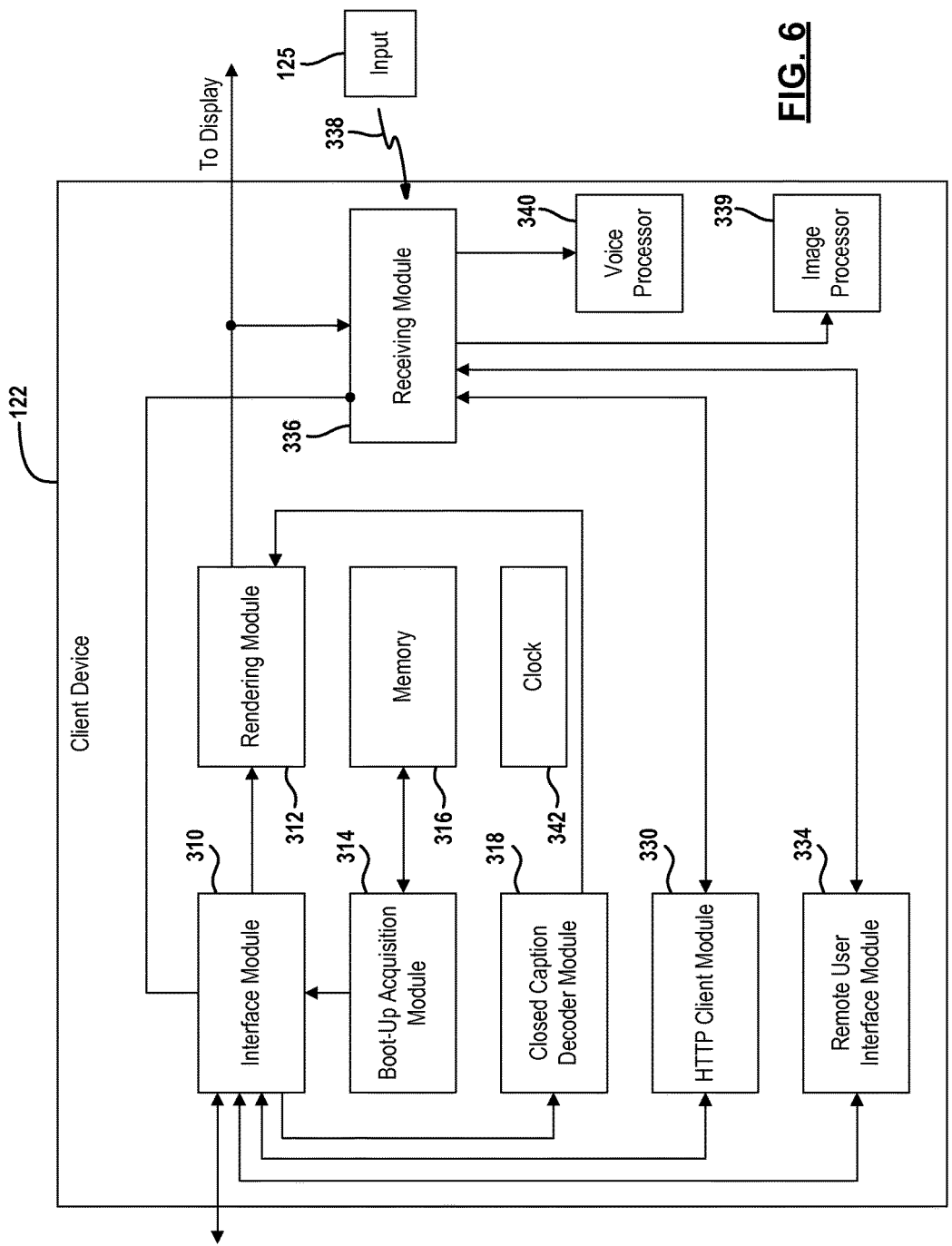
FIG. 6 is a simplified block diagrammatic view of a client device.

Referring now to FIG. 6, a client device 122 is illustrated in further detail. The client device 122 may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate through a local area network to the server device 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 communicates with a rendering module 312. The rendering module 312 receives formatted signals through the local area network that are to be displayed on the display. The rendering module 312 merely places pixels in locations as instructed by the formatted signals. Rendering may also take place using vector graphics commands that instruct a group of pixels to be formed by the client based on simple instructions. By not including a decoder, the rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server device to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlaid upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server device to communicate remote control commands and status to the server device. The remote user interface module 334 may be in communication with the receiving module 336. The receiving module 336 may receive the signals from a remote control or input 125 (FIGS. 2-6) through input 338 associated with the display and convert them to a form usable by the remote user interface module 334. The remote user interface module 334 allows the server device to send graphics and audio and video to provide a full featured user interface within the client. Screen displays may be generated based on the signals from the server device. Thus, the remote user interface module 334 may also receive data through the interface module 310. It should be noted that modules such as the rendering module 312 and the remote user interface module 334 may communicate and render both audio and visual signals.

The receiving module 336 may receive input signals from the input 125 illustrated in FIGS. 2-5. The input 125 may be a visual input signal that may include, but is not limited to, a graphical input signal such as a stylus signal or a gesture signal, a mouse signal, or a pointer signal. Each visual input signal may include a relatively large amount of data compared to a standard button signal from a remote control. The gesture signal may be on a screen or in front of a camera associated with the client device. Each signal may consist of a sequence of numerous sub-signals such as a sequence of multiple point and time positions representing the motion a user makes as an input signal. A graphical input signal might also consist of an image of sequence of images taken from a cell phone camera. An image processor 339 may be coupled to the receiving module 336. The image processor 339 processes the visual input signal to determine a desired control signal to be sent to the server device as a data signal. For example, an image of a face may unlock or reconfigure a client device. A face image may be used to configure setting of a set top box or server device associated with a user.

A voice signal may also be received through the input 338 to the receiving module 336. A voice processor 340 in communication with the receiving module 336 may process or recognize the audio signal and convert the audio voice signal into a text file. Ultimately, the inputs to the receiving module 336 may be communicated through the interface module 310 to the server device.

The data received through the receiving module 336 may be communicated directly to the interface module 310 and ultimately the server device with very little processing because very little processing power may be included within a client device 122. The receiving module 336 may convert the signals input into electrical signals for transmission or communication to the server device. For example, the raw voice signals may be communicated to the server device through the interface module 310. The raw voice signal may be essentially be recorded voice signals with no voice recognition applied thereto.

A clock 342 may communicate with various devices within the system so that the signals and the communications between the server device and client are synchronized and controlled.

Figure 7:
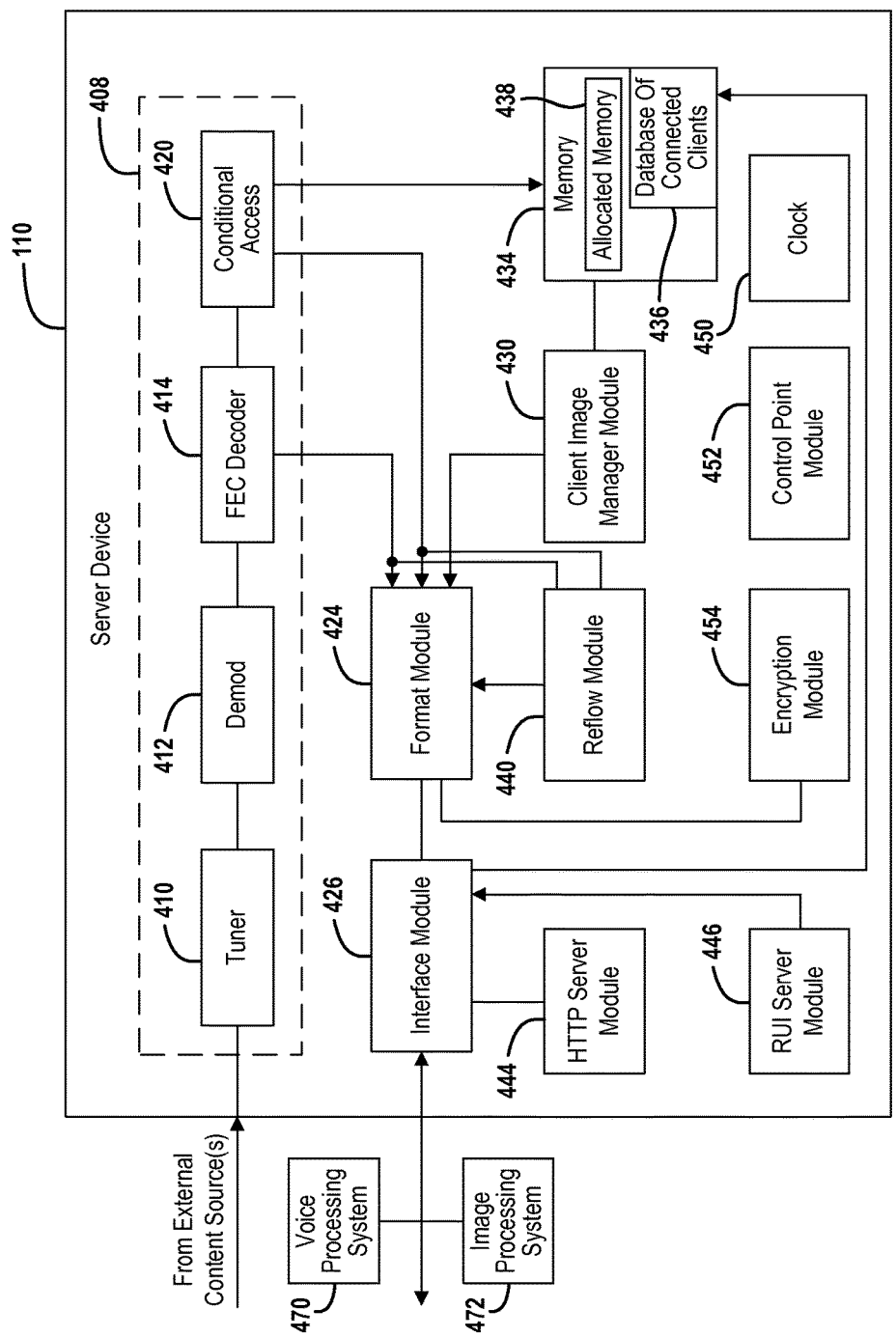
FIG. 7 is a block diagrammatic view of a server.

Referring now to FIG. 7, a server device 110 is illustrated in further detail. The server device 110 is used for communicating with various client devices 122. The server device 110, as mentioned above, may also be used for communicating directly with a display. The server device 110 may be a standalone device or may be provided within another device. For example, the server device 110 may be provided within or incorporated with a standard set top box. The server device 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module 424 may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate comments to control pixels at different locations of the display.

The interface module 426 may be used for receiving input from the client device. For example, the network interface module 426 may receive various types of input data signals communicated from various input devices to the client devices. The data received through the network interface module may include data from a mouse, from a stylus or pointer device, a voice command, or other type of graphical or gesture command.

The network interface module 426 may also communicate with the internet. In the present example, when a voice signal or visual signal is provided the voice signal or visual input signal may be communicated to an external device such as a voice processing system 470 or image processing system 472 to perform voice recognition and return a text signal or command signal to the network interface module 426. The voice processing system 470 and the image processing system 472 may also be included within the server device as well.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory 434 may also contain other data such as a database of connected clients 436. The database of connected clients may also include the client image manager module data.

The memory 434 may also include an allocated memory 438. The allocated memory 438 may also be referred to as a buffer. The allocated memory 438 may vary in size. The memory for the allocated memory 438 is reserved or allocated based on allocate memory commands from the client device as described below. The memory 434 may also be used to store advertisements or other insertion content. The insertion content may be received at various times and stored for ultimate delivery to the clients.

A reflow module 440 may be in communication with the decoded content streamed from the decoder 414 and/or the conditional access module 420. The reflow module 440 will be described in detail below. The reflow module 440 is used for exposing the metadata by partially decoding the transport stream. The metadata of inserted content is adjusted to match the metadata of the main content either on the fly or ahead of time so that the insert material may be spliced into the main content for streaming to the client device. The replacement metadata may be calculated in the head end or server. The insert material is communicated to the client device so that the client device merely plays back the main content and the insert content as any other content. No further interaction from the client device is thus required.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used as a controller to control and supervise the various functions provided above within the server device. The functions may ultimately include, but are not limited to, storing the command data in the allocated memory 438, processing the data to determine what response is desired for the data and generating a response signal to the client.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

An encryption module 454 may also be incorporated into the server device 110 for encrypting the output of the server 110. The encryption module 454 may also provide digital transmission content protection (DTCP) to copy protected content.

Figure 8:
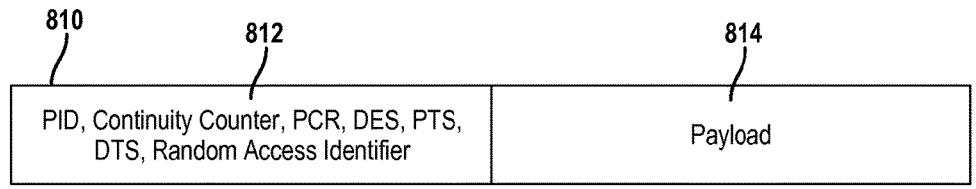
FIG. 8 is a diagrammatic representation of a packet having metadata according to the present disclosure.

Referring now to FIG. 8, a transport stream packet 810 is illustrated. The packet may include a metadata portion 812 and a payload portion 814. The metadata portion 812 may include various types of metadata that have been encoded therein. The payload 814 contains the actual video, audio and alternate audio that is actually displayed to the user. The metadata 812 may not be displayed to the user but is used for assembling and manipulating the various transport stream packets. The metadata 812 may include but is not limited to the following examples. The metadata 812 may contain a continuity counter. The continuity counter helps the media decoder detect missing packets. In most cases the continuity counter is incremented sequentially from 0 to 15 then wraps around to 0 again. It is incremented for packets of the same packet identifier (PID) to help the decoder to detect lost packets. Insert content is likely to be out of sequence relative to the main content. Therefore, the reflow module 440 of FIG. 7 will adjust the continuity counter sequence of the insert content so that the last continuity counter value from the main content right before an insertion start point is kept and incremented, so that the continuity counter value of the insertion content is adjusted. The packet identifier is also adjusted so that the inserted content appears as a continuous stream. The packet identifier is also used by the reflow module to identify packets of interest. It should be noted that all packets may not arrive at the same time and thus the server device organizes the packets. Further, packets not of interest to the particular client device may also be received over the network. Therefore, the packet identifier helps identify relevant packets.

The metadata 812 may also include a packetized elementary stream (PES) header. The PES header metadata may include a presentation time stamp (PTS) that is relative to a program clock reference. A PES data may be brocket up into multiple transport stream packets. The PTS may be relative to the program clock reference so that the 33 bit value is based on a 90 kHz clock. The PES metadata may also include a decoding time stamp (DTS). The program clock reference (PCR) is an increasing time value that is based upon a 27 MHz clock to keep track of the timing of the transport stream packets. The PCR may be estimated before reflowed into the inserted content. Because of the relative reference to the clock, the PCR may be estimated. The Intra-coded-picture frames (I-frames) containing PCR, PTS, DTS could be marked with a random access point using a random access indicator within the metadata. The random access indicators may take place at a predetermined interval such as every one second. The system may use the random access indicator points as places to perform insertion to make the estimation of the PCR, PTS and DTS easier.

As mentioned above, the frames received by the client may be out of sequence and thus to maintain a value of PTS for the inserted content, the PTS containing the earliest PTS and the inserted content may be searched so that a reference PTS can be established and used by the reflow module 440 illustrated in FIG. 7. The DTS may also be searched. The referenced DTS may be found by parsing the first transport stream packet.

Figure 9:
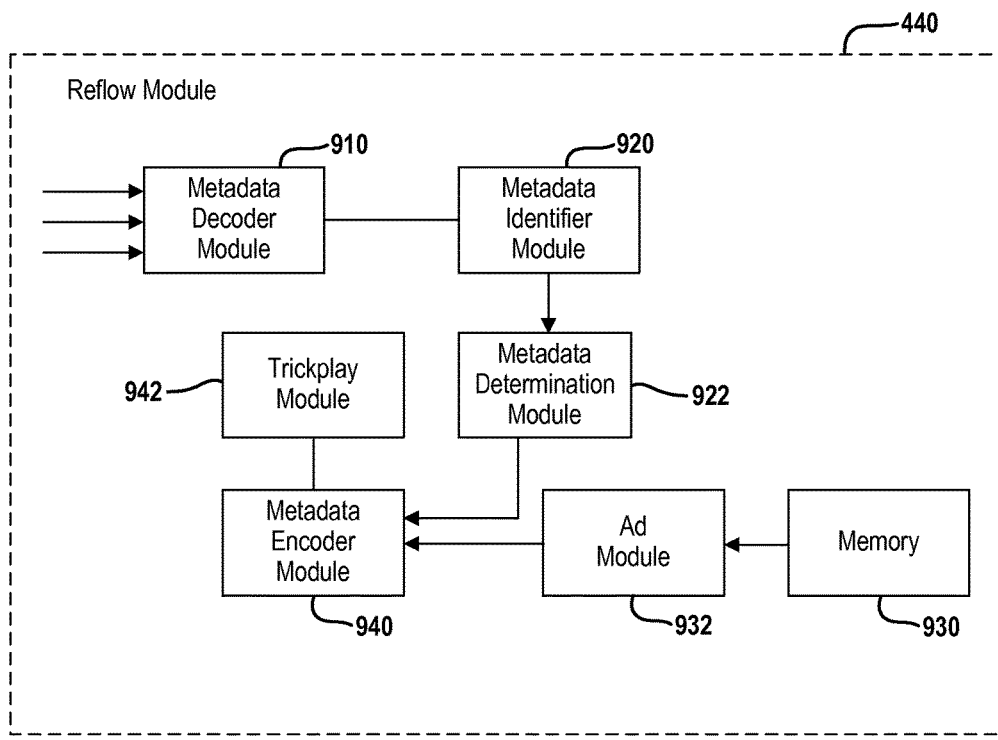
FIG. 9 is a simplified block diagrammatic view of a reflow module.

Referring now to FIG. 9, the reflow module 440 illustrated in FIG. 7 is set forth in further detail. The reflow module 400 includes a metadata decoder module 910. The metadata decoder module 910 is a decoder used for decoding the content transport stream and the packets therein. The metadata decoder module 910 may be a partial decoder that decodes only the metadata from the packets of the content transport layer. In this manner, less expensive partial decoders may be used in a server device that may include several clients coupled thereto.

The metadata decoder module is in communication with a metadata identifier module 920. The metadata identifier module 920 is used to identify relevant content. For example, the metadata identifier module 920 may discard content packets that do not include a packet identifier of interest. A packet identifier of interest may be a packet for content that is currently being communicated to a client device. The metadata identifier module 920 may also be used to identify metadata for content near an insertion start point and an insertion end point.

The reflow module 440 may also include a replacement metadata determination module 922 that determines replacement metadata for insert content. The replacement metadata determination module 922 may perform the same or similar function to the replacement metadata determination module 56. As mentioned above, replacement metadata is used to allow the client device to play the content seamlessly without having to reformat for a discontinuity in the main content. The replacement metadata uses the field value or values of the metadata of the main content (main content field values) to calculate the replacement metadata as replacement or insert content field values. The replacement metadata determined by the replacement metadata determination module 922 may correspond to one or more metadata types. For example the PID may always be changed and one or more other metadata field values may be changed. The replacement metadata process is described in detail below.

The reflow module 440 may have a separate memory 930 or use the same memory 434 of the server device 110 illustrated in FIG. 7. In this example, a new reference number is provided to the memory 930. The memory 930 may be used to store advertisements therein. An advertisement module 932 may be used to provide advertisements from the memory 930 to a metadata encoder module 940. A trickplay module 942 is also in communication with a metadata encoder module. A trickplay module 942 is used to provide trickplay packets to the metadata encoder module. Both the trickplay content and the advertisement content provided by the trickplay module 942 and the advertisement module 932 may be referred to as insert content. The insert content is comprised of packets having metadata that is replaced with replacement metadata to facilitate playing out the content at the client device. In general, the metadata encoder module 940 is used for replacing the metadata in the insert content with replacement metadata to form modified insert packets that allow the client device to seamlessly play content without being "aware" that any change has been made to the content stream. That is, the client device merely plays back the packets in order just as if no insert content was therein.

The trickplay module 942 may allow the server device 110 to provide renderable formatted signals to allow trickplay such as rewinding, forwarding, skipping and the like. Examples of the formatting of packets trickplay will be provided below.

Figure 10:
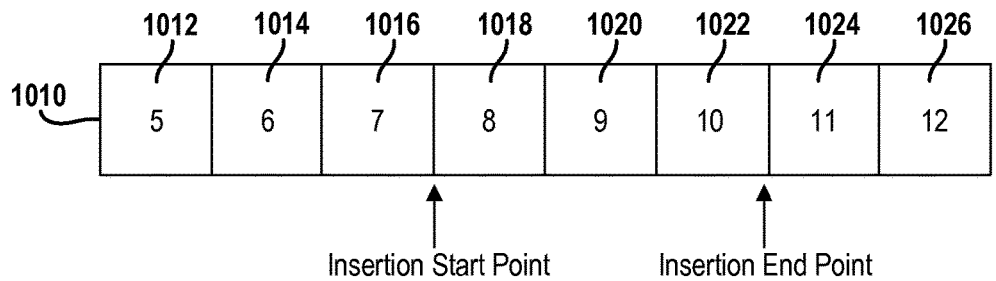
FIG. 10 is a packet representation of main content.

Referring now to FIG. 10, a diagrammatic view of main content 1010 is set forth. The main content 1010 has a plurality of packets 1012-1026. In this example, a continuity counter field value is illustrated in each of the packets. The field values range from 5 to 12 respectively. However, various other metadata field values may be provided for each of the packets. An insert start point and insert end point is illustrated as defining a splice region.

Figure 11:
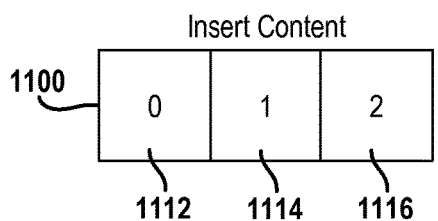
FIG. 11 is a packet representation of insert content.

Referring now to FIG. 11, insert content 1100 is illustrated. Insert content 1100 includes a plurality of packets 1112, 1114 and 1116. Of course, various numbers of packets may be inserted. The insert content 1100 may be advertising or trickplay content. The insert content, to carry on with the example provided in FIG. 10, includes continuity counter field values 0, 1 and 2 respectively. The field values 0, 1 and 2 are not values that are in sequence with the continuity values between the insert start point and the insert end point shown in FIG. 10.

Figure 12:
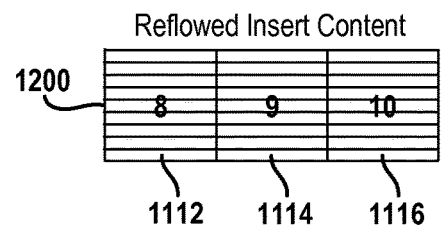
FIG. 12 is a packet representation of reflowed insert content.

Referring now to FIG. 12, reflowed insert content 1200 is illustrated. In this example, packets 1112, 1114 and 1116 have reflowed continuity field values corresponding to 8, 9 and 10. These values are suitable for insertion in the splice region because of their sequential nature.

Figure 13:
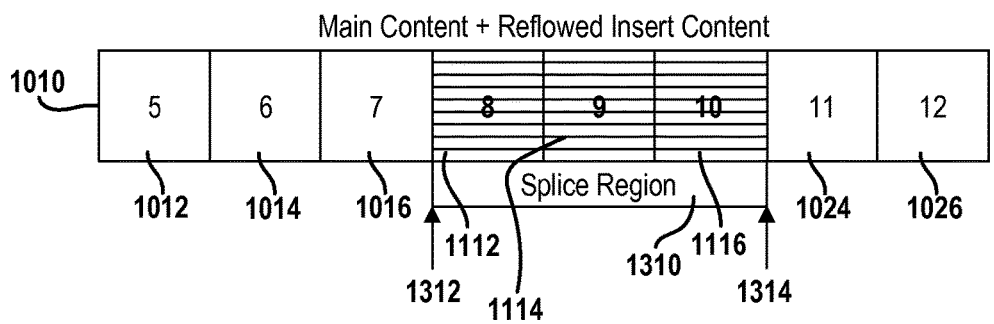
FIG. 13 is a packet representation of main content with reflowed insert content.

Referring now to FIG. 13, a spliced region 1310 of the main content 1010 is set forth. The spliced region begins with the insert start point 1312 and the insert end point 1314 ends the inserted content or splice region. The insert start point may correspond to a random access indicator to allow easier insertion. In this example, packets 1012, 1014 and 1016 are unchanged. The packets 1112, 1114 and 1116 have replacement metadata fields corresponding to FIG. 12. The main content continues after the spliced region 1310. That is, packets 1024 and 1026 have the metadata unchanged.

Figure 14:
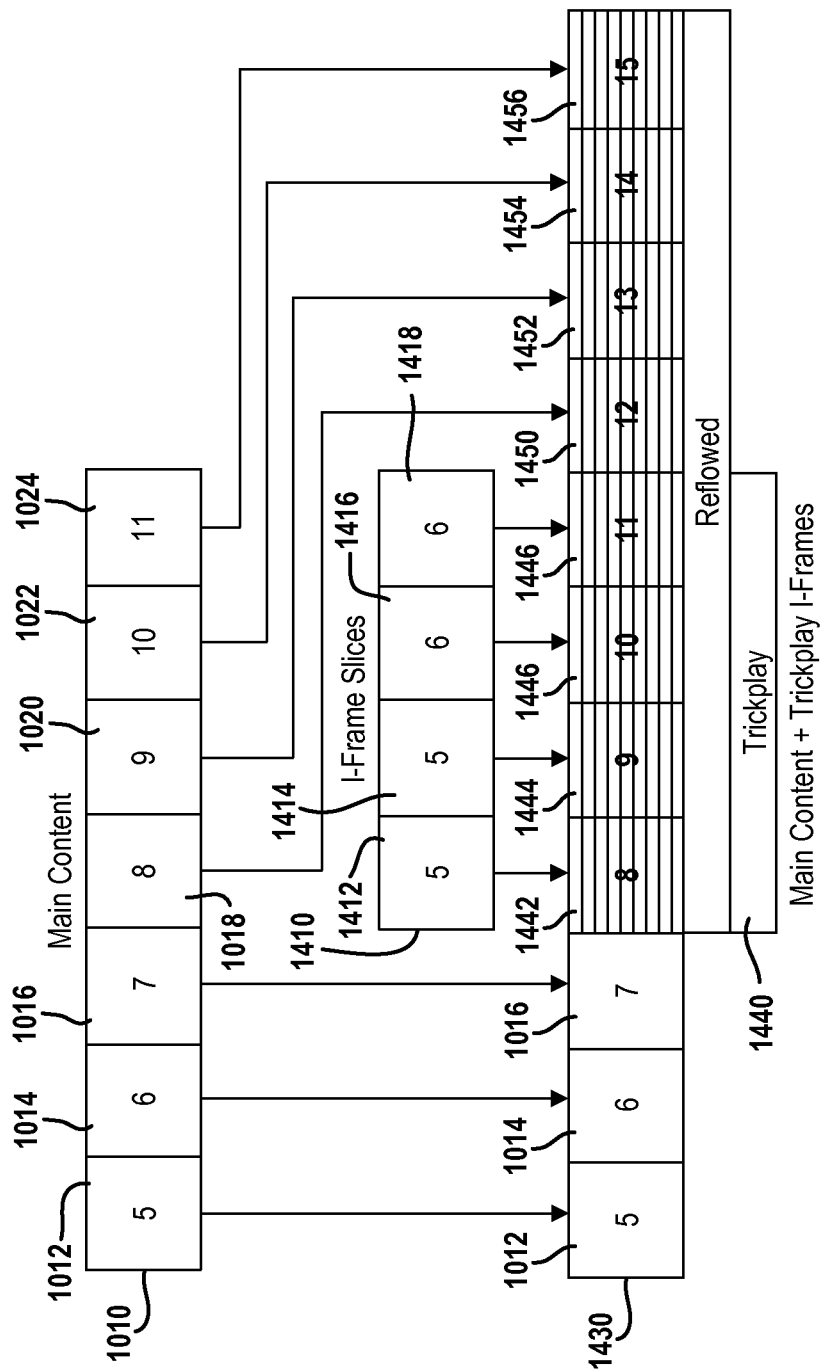
FIG. 14 is a packet representation of main content plus trickplay I-frames.

Referring now to FIG. 14, trickplay may also be implemented using reflowed packets. Intra-coded-picture frame (I-frame) splices may be inserted in a trickplay area. In this example, the main content 1010 has packets 1012-1024 as is illustrated in FIG. 10. The insert portion 1410 includes packets 1412, 1414, 1416 and 1418. The reflowed main content 1430 is illustrated near the bottom of FIG. 14. The reflowed content 1430 includes packets from the main content 1010 that have not been modified. The packets 1012, 1014 and 1016 of the main content have fields that have not been modified. The insert content 1410 may include I-frame splices that have metadata field values that have been modified. In this example, the I-frame splices have a continuity counter of 5 for packets 1412 and packets 1414 and 6 for packets 1416 and 1418. In a trickplay region 1440, the I-frame packets splices 1412-1418 have field values that have been modified with continuity counter values 8, 9, 10 and 11 respectively to form packets 1442, 1444, 1446 and 1448 respectively.

However, in this example, the main content is also reflowed to allow the client device to continue playing when the trickplay is over. Packets 1018, 1020, 1022 and 1024 have been reflowed to packets 1450, 1452, 1454 and 1456. That is, the continuity counter in this example has been modified in packet 1018 from 8 to 12. Packet 1020 has the continuity counter field value 9 changed to field value 13. Packet 1022 has continuity counter field value 10 changed to 14 and packet 1024 has the continuity counter field value 11 changed to 15. Thus, the reflowed content corresponds to packets 1442-1456 of FIG. 14.

Figure 15:
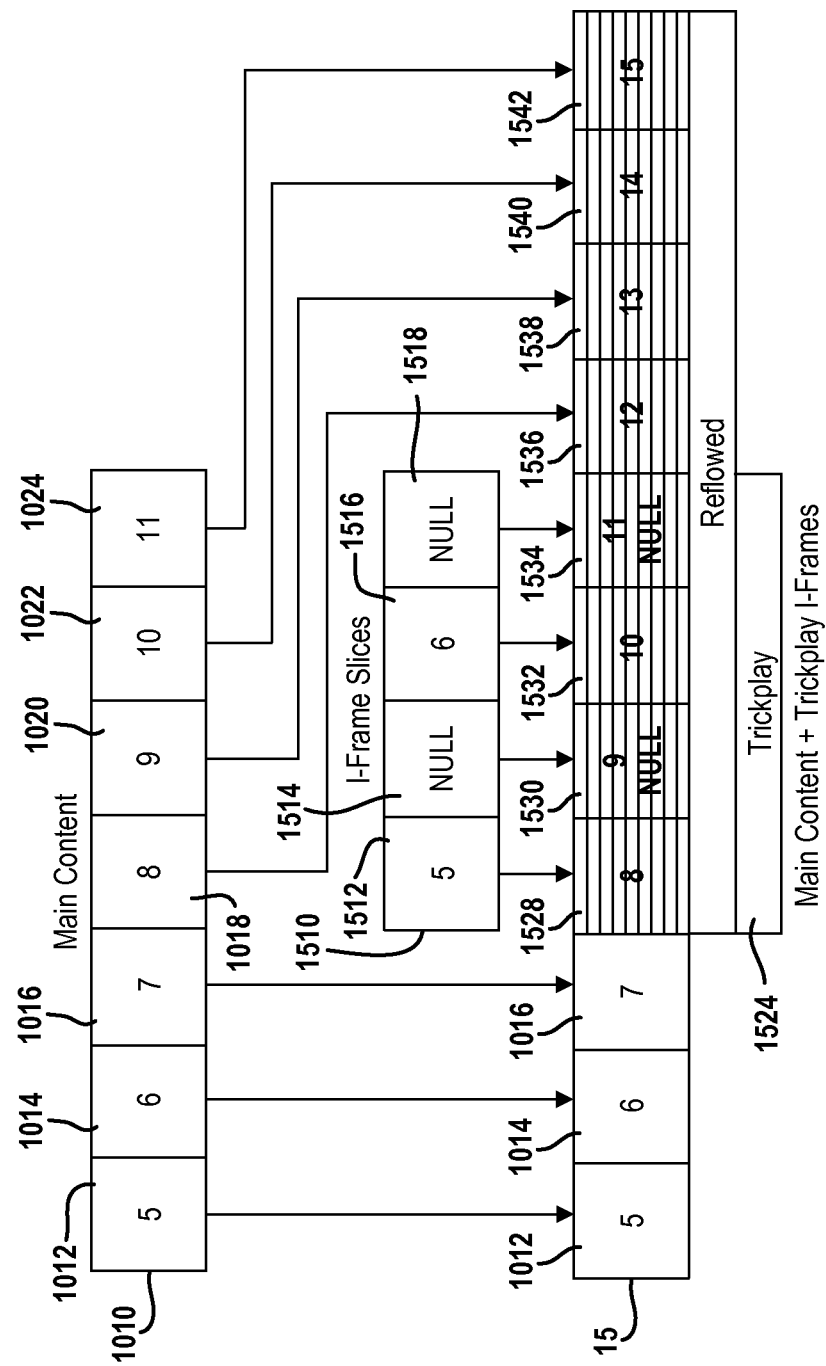
FIG. 15 is another embodiment for trickplay containing main content packets and trickplay I-frames.

Referring now to FIG. 15, another example of trickplay for bandwidth optimization is set forth. In this example, the main content 1010 having packets 1012-1024 as illustrated in FIGS. 10 and 14 is set forth. In this example, inserted content 1510 includes packets 1512, 1514, 1516 and 1518. Packet 1512 has a continuity counter field value corresponding to 5. Packet 1514 is a null packet to facilitate the trickplay. Packet 1516 has continuity counter field value 16 and packet 1518 corresponds to another null packet. In a trickplay region 1524 packets 1512-1518 have been renumbered to packets 1528, 1530, 1532 and 1534. The continuity counter field values have also been reflowed to be in sequence with the packets 1012-1016 at continuity counter field values 8-11. After packet 1534, main content packets 1018-1024 also have the continuity counter field values reflowed at packets 1536, 1538, 1540 and 1542. The continuity counter field values for packets 1536-1542 correspond to 12-15.

Figure 16:
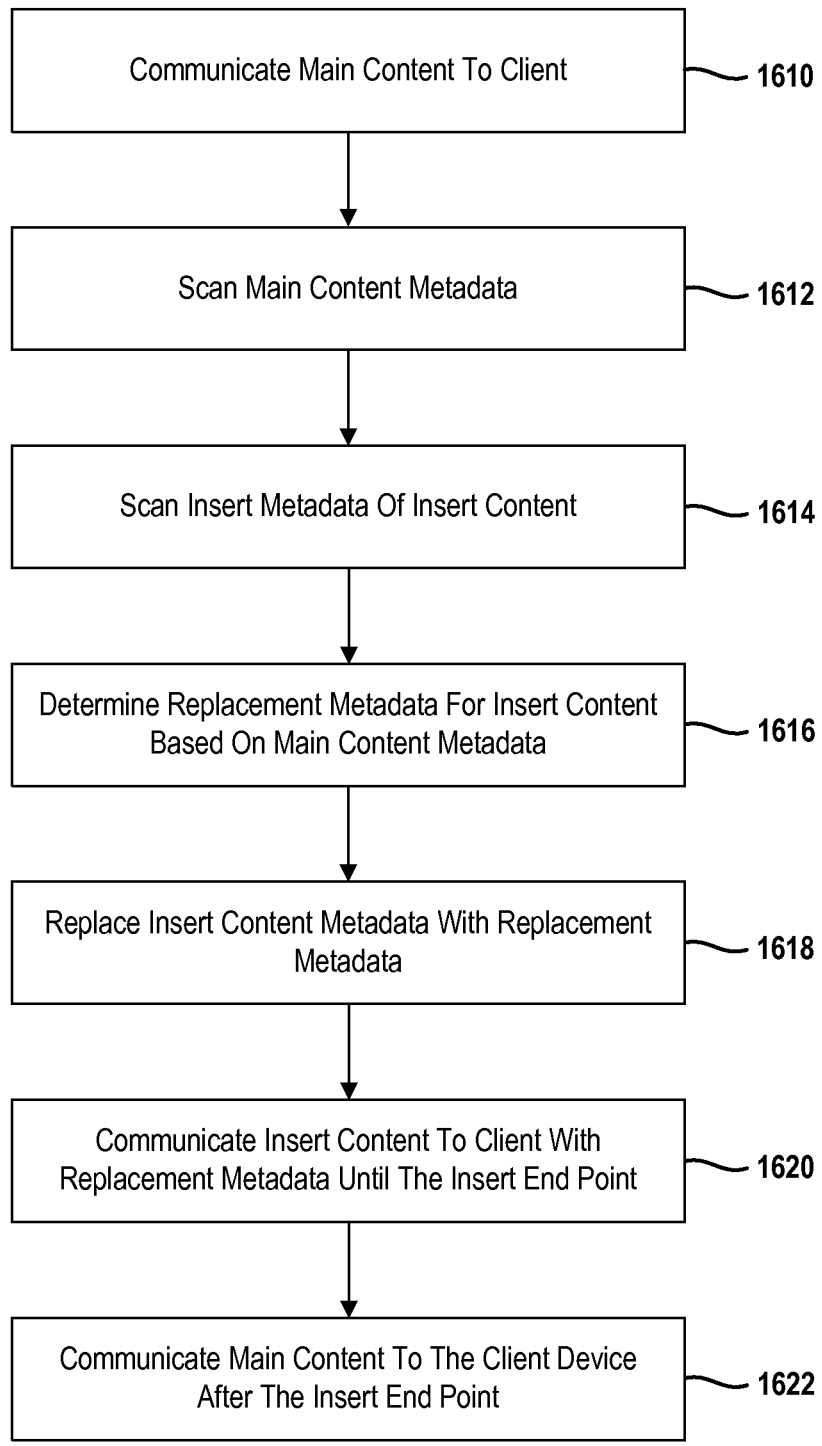
FIG. 16 is a simplified flowchart for reflowing packets.

Referring now to FIG. 16, a high level flow chart of a method for reflowing content is set forth. Reflowing changes the field values for selected metadata to allow seamless playback by an unsophisticated client device with limited processing power. In step 1610, main content is communicated from the server to the client through a local area network. In step 1612, the main content packets are scanned for metadata. The metadata being scanned is for the transport stream (PID) of interest. The transport stream of interest is the content being communicated to the client.

In step 1614, insert content is scanned to obtain the insert metadata. In step 1616, replacement metadata based on the main content metadata is determined for the insert content. The field values are thus replaced in the replacement metadata. The calculations for determining the replacement data is set forth below. Some metadata fields are more calculation intensive than others.

In step 1618, the replacement metadata field values are inserted within each packet of the insert content. In step 1620, the insert content is communicated to the client device with the replacement metadata until the insert end point.

In step 1622, the main content is then communicated to the client device after the insert end point.

Figure 17:
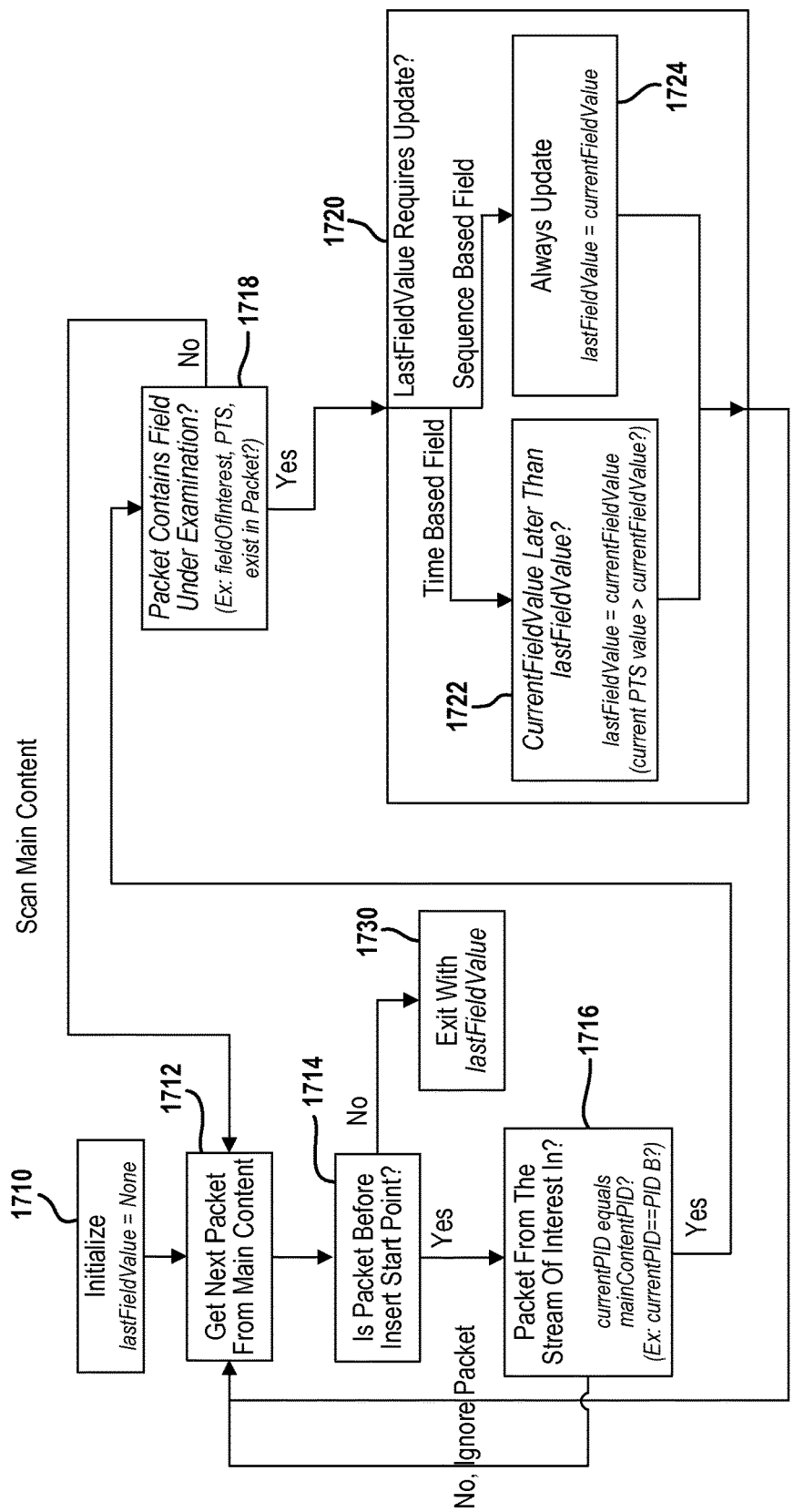
FIG. 17 is a flowchart for scanning main content.

Referring now to FIG. 17, a method for scanning the main content is set forth. In step 1710, the system is initialized by setting the variable "lastFieldValue" to none. In step 1712 the reflow module monitors the packets from the main content. Step 1712 views the next packet. In step 1714, it is determined whether the packet is the packet before the insert start point. If the packet is before the insert start point, step 1716 is performed. In step 1716, if the packet is not from a packet of interest, step 1712 is performed. To determine whether a packet is a packet of interest, the packet identifier may be monitored. If the packet is a packet of interest, step 1718 is performed. Step 1718 determines whether a field of interest that is under examination is included within the packet. Step 1712 is performed after step 1718 when the packet does not contain a field of interest. After step 1718, step 1720 determines whether the field value requires a field update. Step 1720 contains two steps: 1722 and 1724. Step 1722 is used for a time based field and step 1724 is used for a sequence based field. For a time based field in step 1722, the current last field value is set to the current field value. When the current field value is later than the last field value. This is performed because, as mentioned above, the packets may not necessarily be received in time order.

Step 1724 is performed for a sequenced-based field. In step 1724, the last field value is set to the current field value. After step 1722 and 1724, step 1712 is again performed.

Referring back to step 1714, the system returns the last field value in step 1730 when step 1714 determines that the packet is not before the insert start point. That is, once the insert start point has passed step 1730 is performed.

Figure 18:
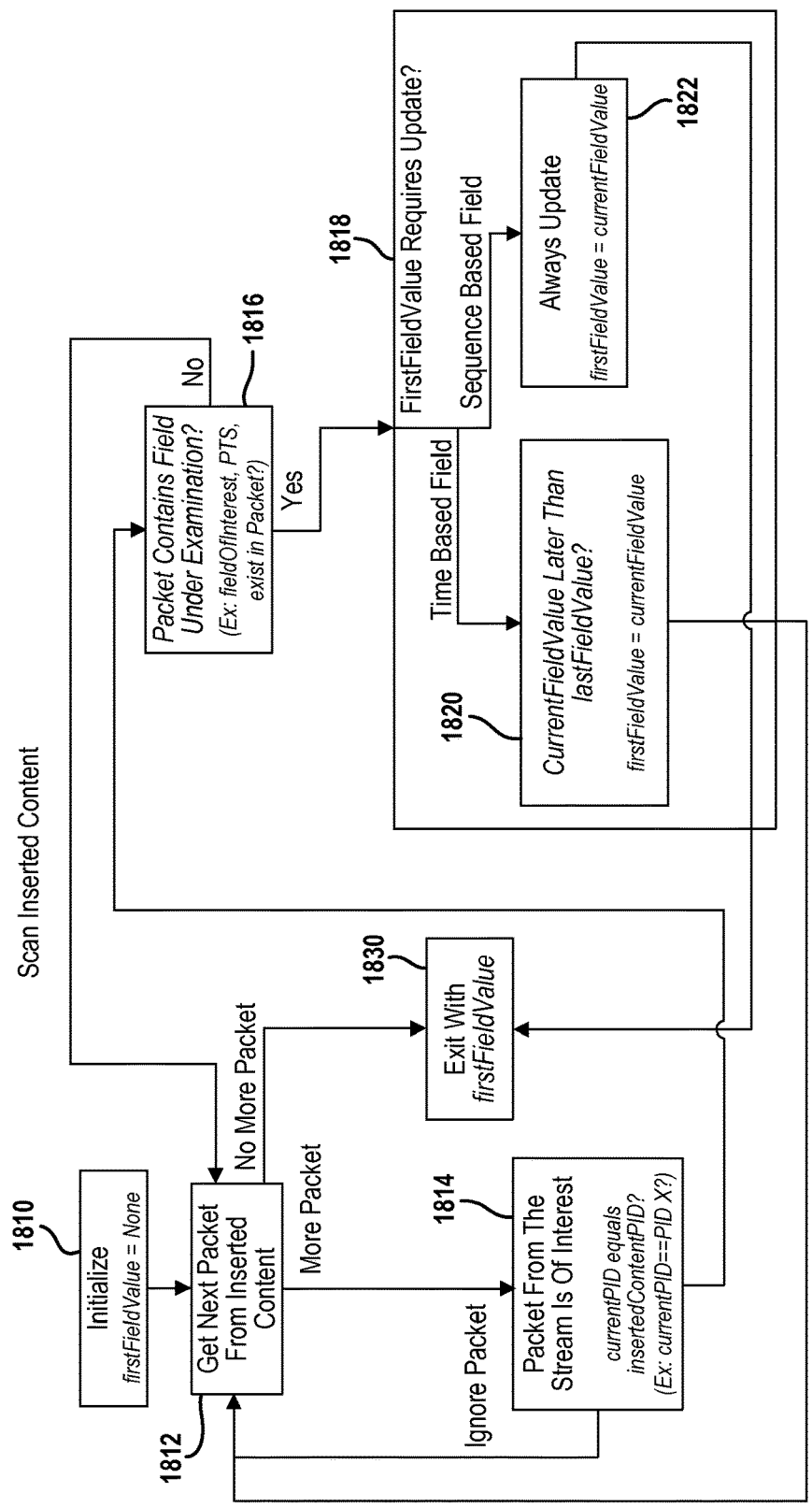
FIG. 18 is a flowchart for scanning insert content.

Referring now to FIG. 18, scanning inserted content is performed. In step 1810, the first field value (firstFieldValue) is initialized. That is, the first field value is reset to none. In step 1812, a next packet from the inserted content is retrieved. This may be performed by retrieving an advertisement from the memory. After steps 1812, if more packets are available, step 1814 monitors the packets to determine whether the packet is of interest. In step 1814, the current packet identifier is compared to the insert content packet identifier. If the packet is not of interest as identified by the packet identifier, step 1812 is again performed.

In step 1814, when the packet is a packet of interest, step 1816 is performed. In step 1816 it is determined whether the packet being analyzed from the insert content has a field that is under examination. If the packet does not have a field under examination, step 1812 is again performed.

Step 1818 is performed after step 1816. That is, step 1818 is performed when the insert content packet being analyzed has the field of interest. Step 1818 has two different paths depending on whether the packet is a time based field or a sequence based field in a similar manner to that set forth above in FIG. 17. Step 1820 is performed that sets the first field value equal to the current field value when the current field value is earlier than the first field value. Step 1822 is performed for sequence based fields. In this example, the first field values set to the current field value.

Referring back to step 1812, when no more packets of scanned inserted content are available, step 1830 exits the process with the first field value. Step 1830 is also performed after step 1822.

Figure 19:
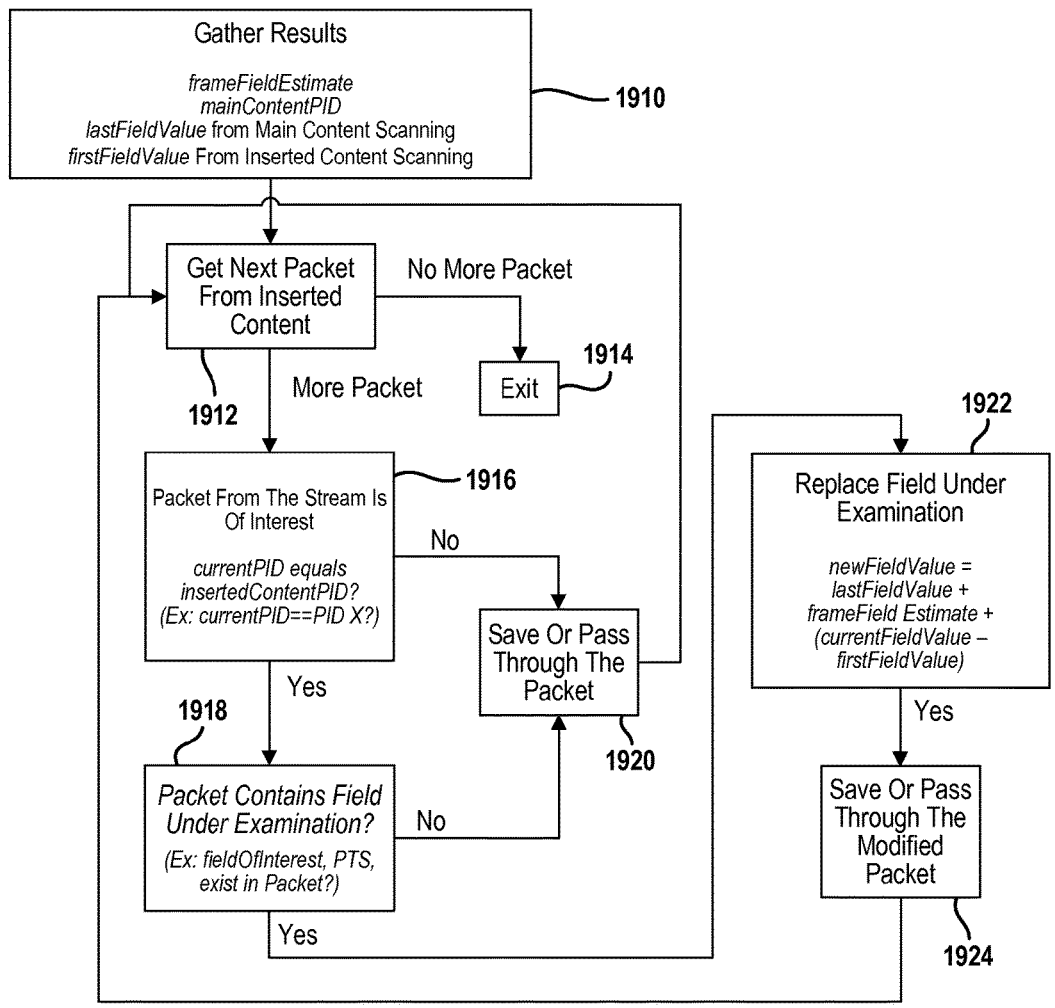
FIG. 19 is a flowchart for reflowing insert content.

Referring now to FIG. 19, a method for reflowing insert content is set forth. The calculation of the replacement metadata may take place in the server device or head end. In step 1910, the last field value from the main content scanning of FIG. 17 is obtained. The first field value is also obtained from the method set forth in FIG. 18. The main content packet identifier and a frame field estimate are also determined in step 1910. The next packet of inserted content is obtained after step 1910 in step 1912. If no more insert packets are available, step 1914 is performed which exits the process. After step 1912, if more packets are available step 1916 determines whether the packet is from a stream of interest. If the current packet is from the stream of interest in step 1916, step 1918 determines whether the current insert packet contains a field under examination. In steps 1916 and 1918, step 1920 is performed when the packet is not from the stream of interest or does not have a field that is under examination. After step 1920, step 1912 is again performed.

After step 1918, when the packet for the insert content contains a field under examination, step 1922 is performed. In this step, replacement metadata is generated by generating a "new field value." The new field value is equal to the last field value summed with the frame field estimate which is summed with the difference of the current field value and the first field value. Of course, replacement packets may be determined in different ways depending on the type of packet. In some, the replacement metadata is determined based upon the last field value of the main content. After step 1922, step 1924 saves or passes through the modified packet. The modified insert packet is passed through or communicated to the client device in step 1924. After step 1924, step 1912 is again performed until the end of the insert packet. The frame field estimate is an estimated field value different between the last field value and the main content (last field value) at the insert start point and the first field value in the insert content field (the first field value). In the case of a PTS field, the field estimate would be $\frac{1}{60}$ Hz/$\frac{1}{90}$ kHz which equals 1500 to account for the time difference between the last frame and the main content and the insert content start point.

Figure 20:
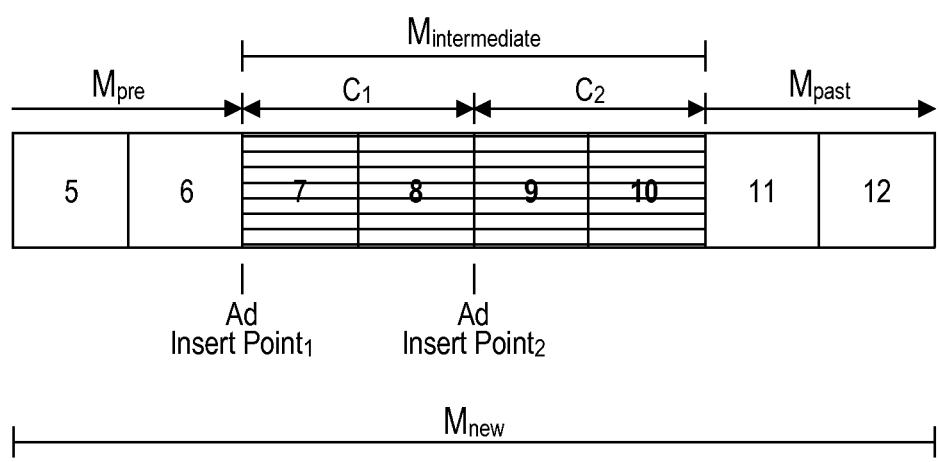
FIG. 20 is a simplified packet representation of two consecutive advertisements in a content stream.

Referring now to FIG. 20, the above technique works equally well for inserting more than one advertisement as well. The above scanning and reflow technique may be described, in abstract, by a function reflow(M, C) such that a single ad-insertion can be described as $M_{new}=M_{pre}+$reflow$(M, C)+M_{past}$ where $M_{pre}$ is the main content from the beginning up to the insert start point, C is the inserted content, $M_{past}$ is the main content from the insert end point to the end of the main content, and $M_{new}$ is the final content with the ad inserted in between the insert start point and insert end point in the main content. Back-to-back ad-insertion for two ads can be described conceptually by $M_{intermediate}=M_{pre}+$reflow $(M, C_1)$ and $M_{new}=M_{intermediate}$ reflow $(M_{intermediate}, C_2)+M_{post}$ where $C_1$ is the first inserted ad-content and $C_2$ is the second inserted back-to-back ad-content. This method of recursively defining the reflow process can support an infinite arbitrary number of content insertions into a main content.

Trickplay can conceptually be described by the above theoretical back-to-back ad-insertion, where each inserted content consists of a single frame of content. The inserted content, or single frame of trickplay, can be repeated to achieve the desired trickplay speed and effect. Similarly, the optimized reflowed trickplay can be described using the above recursive algorithm where the inserted contents consist of one I-frame's content followed by less bandwidth consuming packets such as null packets, padding stream, or empty P-frames, repeated, followed by more of the I-frame content and less bandwidth consuming packet sets to achieve the desired trickplay speed and effects.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of communicating between a client device and a server device through a local area network comprising:
   receiving main content by a server device, the main content comprising (i) a first plurality of main content packets and (ii) a second plurality of main content packets, the second plurality of main content packets being different than the first plurality of main content packets;
   partially decoding the main content to expose main content metadata including (i) first main content metadata of the first plurality of main content packets and (ii) second main content metadata of the second plurality of main content packets, the first main content metadata including first continuity counter values for the first plurality of main content packets, respectively, the first continuity counter values following a predetermined sequence, and the second main content metadata including second continuity counter values for the second plurality of main content packets, respectively, the second continuity counter values being continuous with the first continuity counter values and following the predetermined sequence;

receiving, by the server device, insert content to be inserted between (i) a last one of the first plurality of main content packets and (ii) a first one of the second plurality of main content packets, the insert content comprising a plurality of insert content packets;

partially decoding, by the server device, the insert content to expose insert content metadata of the plurality of insert content packets, the insert content metadata including third continuity counter values for the plurality of insert content packets, respectively;

determining, based on the one of the first continuity counter values of the last one of the first plurality of main content packets, first replacement continuity counter values for the insert content packets, respectively, the first replacement continuity counter values for the insert content packets, respectively, continuing the predetermined sequence followed by the first continuity counter values of the first plurality of main content packets;

determining, based on the one of the first replacement continuity counter values of the last one of the insert content packets, second replacement continuity counter values for the second plurality of main content packets, the second replacement continuity counter values for the second plurality of main content packets continuing the predetermined sequence followed by the first replacement continuity counter values of the insert content packets;

communicating, by the server device to the client device, a content stream including:
  (a) communicating the first plurality of main content packets and the first continuity counter values for the first plurality of main content packets, respectively;
  (b) following (a), communicating the plurality of insert content packets and the first replacement continuity counter values for the insert content packets, respectively; and
  (c) following (b), communicating the second plurality of main content packets and the second replacement continuity counter values for the second plurality of main content packets, respectively.

2. The method of claim 1 wherein the first main content metadata further includes a first packet identifier (PID), the insert content metadata further includes a second PID that is different than the first PID, and the second main content metadata further includes a third PID that is the same value as the first PID, and the method further comprising:

setting the second PID of the insert content metadata to the same value as the first PID and the third PID; and
communicating the first PID with the first plurality of main content packets in the content stream;
communicating the second PID with the plurality of insert content packets in the content stream; and
communicating the third PID with the second plurality of main content packets in the content stream.

3. The method of claim 1 wherein the insert content comprises intra-coded picture frames.

4. The method of claim 1 wherein the insert content comprises intra-coded picture frames and null packets.

5. The method of claim 1 wherein the insert content comprises an advertisement.

6. The method of claim 1 wherein the insert content comprises trickplay content.

7. The method of claim 1 wherein the main content metadata further includes a program clock reference, a packet identifier, presentation time stamp, and decoding time stamp.

8. The method of claim 1 further comprising:
determining the first replacement continuity counter values for the insert content packets, respectively, at a head end;
determining the second replacement continuity counter values for the second plurality of main content packets, respectively, at the head end; and
communicating the first replacement continuity counter values and the second replacement continuity counter values from the head end to the server device.

9. A system comprising:
a local area network;
a client device;
a server device in communication with the client device through the local area network, said server device:
  receiving main content, the main content comprising (i) a first plurality of main content packets and (ii) a second plurality of main content packets, the second plurality of main content packets being different than the first plurality of main content packets;
  partially decoding the main content to expose main content metadata including (i) first main content metadata of the first plurality of main content packets and (ii) second main content metadata of the second plurality of main content packets,
  the first main content metadata including first continuity counter values for the first plurality of main content packets, respectively, the first continuity counter values following a predetermined sequence, and
  the second main content metadata including second continuity counter values for the second plurality of main content packets, respectively, the second continuity counter values being continuous with the first continuity counter values and following the predetermined sequence;
  receiving insert content to be inserted between (i) a last one of the first plurality of main content packets and (ii) a first one of the second plurality of main content packets, the insert content comprising a plurality of insert content packets;
  partially decoding the insert content to expose insert content metadata of the plurality of insert content packets,
  the insert content metadata including third continuity counter values for the plurality of insert content packets, respectively;
  determining, based on the one of the first continuity counter values of the last one of the first plurality of main content packets, first replacement continuity counter values for the insert content packets, respectively, the first replacement continuity counter values for the insert content packets, respectively, continuing the predetermined sequence followed by the first continuity counter values of the first plurality of main content packets;

determining, based on the one of the first replacement continuity counter values of the last one of the insert content packets, second replacement continuity counter values for the second plurality of main content packets, the second replacement continuity counter values for the second plurality of main content packets continuing the predetermined sequence followed by the first replacement continuity counter values of the insert content packets;

communicating a content stream to the client device, including:
  (a) communicating the first plurality of main content packets and the first continuity counter values for the first plurality of main content packets, respectively;
  (b) following (a), communicating the plurality of insert content packets and the first replacement continuity counter values for the insert content packets, respectively; and
  (c) following (b), communicating the second plurality of main content packets and the second replacement continuity counter values for the second plurality of main content packets, respectively.

10. The system of claim 9 wherein the first main content metadata further includes a first packet identifier (PID), the insert content metadata further includes a second PID that is different than the first PID, and the second main content metadata further includes a third PID that is the same value as the first PID, said server device further:
  setting the second PID of the insert content metadata to the same value as the first PID and the third PID; and
  communicating the first PID with the first plurality of main content packets in the content stream;
  communicating the second PID with the plurality of insert content packets in the content stream; and
  communicating the third PID with the second plurality of main content packets in the content stream.

11. The system of claim 9 wherein the insert content comprises intra-coded picture frames.

12. The system of claim 9 wherein the insert content comprises intra-coded picture frames and null packets.

13. The system of claim 9 wherein the insert content comprises an advertisement.

14. The system of claim 9 wherein the insert content comprises trickplay content.

15. The system of claim 9 wherein the main content metadata further includes a program clock reference, a packet identifier, presentation time stamp, and decoding time stamp.

16. A method of communicating between a client device and a server device through a local area network comprising:
  receiving main content by a server device, the main content comprising (i) a first plurality of main content packets and (ii) a second plurality of main content packets, the second plurality of main content packets being different than the first plurality of main content packets;
  partially decoding the main content to expose main content metadata including (i) first main content metadata of the first plurality of main content packets and (ii) second main content metadata of the second plurality of main content packets,
    the first main content metadata including first continuity counter values for the first plurality of main content packets, respectively, that follow a predetermined sequence, and
    the second main content metadata including second continuity counter values for the second plurality of main content packets, respectively, that follow the predetermined sequence;
  receiving, by the server device, insert content to be inserted between (i) a last one of the first plurality of main content packets and (ii) a first one of the second plurality of main content packets, the insert content comprising a plurality of insert content packets;
  partially decoding the insert content to expose insert content metadata of the plurality of insert content packets,
    the insert content metadata including third continuity counter values for the plurality of insert content packets, respectively;
  replacing the third continuity counter values with replacement continuity counter values such that the third continuity counter values both (i) follow the predetermined sequence and (ii) are continuous with an end of the first continuity counter values and a beginning of the second continuity counter values; and
  communicating, by the server device to the client device, a content stream including:
    (a) communicating the first plurality of main content packets and the first continuity counter values for the first plurality of main content packets, respectively;
    (b) following (a), communicating the plurality of insert content packets and the third continuity counter values for the insert content packets, respectively; and
    (c) following (b), communicating the second plurality of main content packets and the second continuity counter values for the second plurality of main content packets, respectively.

* * * * *